(12) United States Patent
Gill et al.

(10) Patent No.: US 7,616,854 B2
(45) Date of Patent: Nov. 10, 2009

(54) OPTICAL COUPLING STRUCTURE

(75) Inventors: Douglas M. Gill, South Orange, NJ (US); Sanjay Patel, New Providence, NJ (US); Mahmoud Rasras, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/746,162

(22) Filed: May 9, 2007

(65) Prior Publication Data

US 2008/0279505 A1  Nov. 13, 2008

(51) Int. Cl.
 *G02B 6/26* (2006.01)
(52) U.S. Cl. .............................. 385/50; 385/43; 385/45; 385/129; 385/27
(58) Field of Classification Search .................. 385/129, 385/131, 132, 14, 17, 28, 43, 45, 50, 2, 27, 385/37
See application file for complete search history.

(56) References Cited

U.S. PATENT DOCUMENTS

| | | | | |
|---|---|---|---|---|
| 5,265,177 | A * | 11/1993 | Cho et al. | 385/14 |
| 5,568,579 | A * | 10/1996 | Okaniwa | 385/43 |
| 5,703,895 | A * | 12/1997 | Ghirardi et al. | 372/50.1 |
| 6,345,138 | B1 * | 2/2002 | Kawai et al. | 385/49 |
| 6,571,039 | B1 * | 5/2003 | Al-hemyari et al. | 385/43 |
| 6,697,551 | B2 * | 2/2004 | Lee et al. | 385/28 |
| 6,987,919 | B2 * | 1/2006 | Luo et al. | 385/129 |
| 7,099,540 | B2 * | 8/2006 | Shimoda | 385/50 |
| 7,251,406 | B2 * | 7/2007 | Luo et al. | 385/131 |
| 7,343,061 | B2 * | 3/2008 | Forrest et al. | 385/14 |
| 7,471,855 | B2 * | 12/2008 | Chen et al. | 385/14 |
| 7,474,817 | B2 * | 1/2009 | Nunoya et al. | 385/14 |
| 2002/0118916 | A1 * | 8/2002 | Lee et al. | 385/28 |
| 2002/0191916 | A1 * | 12/2002 | Frish et al. | 385/43 |
| 2003/0007719 | A1 * | 1/2003 | Forrest et al. | 385/14 |

(Continued)

FOREIGN PATENT DOCUMENTS

EP  1378772 A2  1/2004

(Continued)

OTHER PUBLICATIONS

Laurent Vivien, et al.; "2-D Taper for Low-Loss Coupling Betweenpolarization-Insensitive Microwaveguides and Single-Mode Optical Fibers"; IEEE; Journal of Lightwave Technology; vol. 21, No. 10, Oct. 2003; pp. 1-5 (XP-11102211A).

(Continued)

*Primary Examiner*—Ellen Kim
(74) *Attorney, Agent, or Firm*—Hitt Gaines, PC

(57) ABSTRACT

The present invention provides an apparatus and method for operation therefore. The apparatus, in one embodiment, includes an optical coupling structure disposed within a cladding region, wherein the optical coupling structure includes a first guiding portion and a second guiding portion. In this embodiment the first guiding portion has a first end proximate a core of a planar waveguide, and a second end proximate the second guiding portion and having a first thickness. Moreover, in this embodiment the second guiding portion has a first end proximate the first guiding portion and a second end, the second end of the second guiding portion having a second thickness less than the first thickness.

21 Claims, 8 Drawing Sheets

U.S. PATENT DOCUMENTS

| | | |
|---|---|---|
| 2003/0138216 A1* | 7/2003 | Shimoda ................... 385/50 |
| 2004/0017976 A1 | 1/2004 | Luo et al. |
| 2004/0114869 A1* | 6/2004 | Fike et al. ................. 385/43 |
| 2005/0152648 A1 | 7/2005 | Madsen et al. |
| 2006/0032832 A1 | 2/2006 | Choi |
| 2007/0274654 A1* | 11/2007 | Choudhury et al. ......... 385/131 |

FOREIGN PATENT DOCUMENTS

| | | |
|---|---|---|
| JP | 6-174982 A | 6/1994 |

OTHER PUBLICATIONS

Naoaki Yamaguchi, et al.; Low-Loss Spot-Size Transformer by Dual Tapered Waveguides (DTW-SST); IEEE; Journal of Lightwave Technology, vol. 8, No. 4, Apr. 1990; pp. 587-594. (XP-126588A).

Search Report and Written Opinion dated Jun. 3, 2008 for International Application No. PCT/US2008/000113.

* cited by examiner

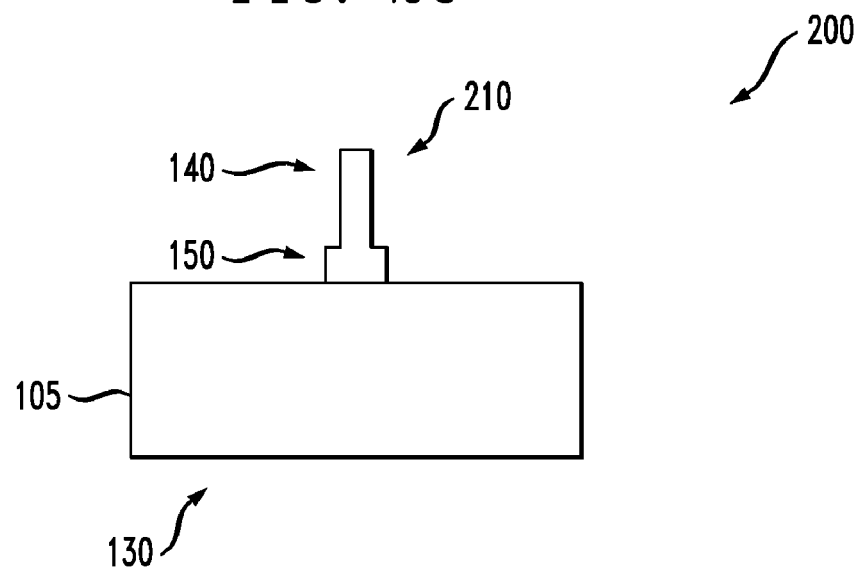
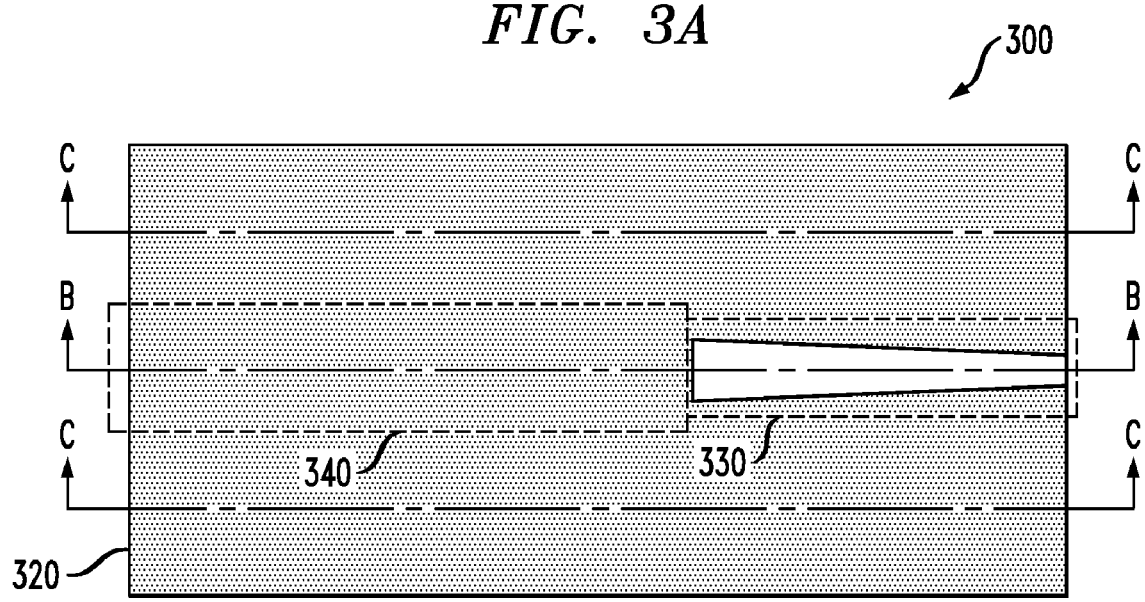

OPTICAL COUPLING STRUCTURE

U.S. GOVERNMENT

The U.S. Government has a paid-up license in this invention and the right in limited circumstances to require the patent owner to license others on reasonable terms as provided for by the terms of Contract No. HR011-05-C-0027 awarded by DARPA.

TECHNICAL FIELD OF THE INVENTION

The present invention is directed, in general, to an optical apparatus and, more specifically, to an optical coupling structure and method for operating the same.

BACKGROUND OF THE INVENTION

Planar waveguide devices are important components of optical fiber communication systems. Such systems typically comprise long lengths of fiber for transmission and often use planar waveguide devices to perform a variety of processes such as filtering, multiplexing signal channels, demultiplexing, compensating chromatic dispersion and compensating polarization dispersion.

An optical fiber is typically in the form of a thin strand of glass having a central core of circular cross section peripherally surrounded by concentric cladding glass. The core has a higher refractive index than the cladding so that the light is retained in the core by total internal reflection and propagates in a fiber mode. For long distance transmission the core dimensions are typically chosen so that the light propagates in a single circular mode.

A planar waveguide device, in contrast, may be formed from a layer of silicon surrounded by a silicon dioxide cladding layer. The core is typically of rectangular cross section. The core region is formed, as by etching of a masked surface, into a patterned configuration that performs a desired function. In order to permit small radius curves, and thus compact functionality, the difference in refractive index of the planar waveguide core and the index of the cladding is typically substantially greater than the corresponding difference for optical fibers. The planar waveguide is said to be high delta where delta ($\Delta$) is given by the core index less the cladding index, all divided by the core index.

SUMMARY OF THE INVENTION

Problems exist in coupling light from transmission fibers into planar waveguides. In addition to a mismatch in refractive indices, there is also a mismatch in core size. The core size for a typical optical fiber is significantly larger than the optimal core size for a single mode planar waveguide; therefore, their optical modes don't match because the field is more confined in the waveguide than in the fiber. In addition, the mode shape in the waveguide is different than in the fiber. As a consequence of these mismatches, direct coupling of a fiber to the planar waveguide would incur significant insertion loss of the optical beam. To address this deficiency, provided is an apparatus and method for operation therefore.

The apparatus, in one embodiment, includes an optical coupling structure disposed within a cladding region, wherein the optical coupling structure includes a first guiding portion and a second guiding portion. In this embodiment, the first guiding portion has a first end proximate a core of a planar waveguide, and a second end proximate the second guiding portion and having a first thickness. In some embodiments, the first end has a cross-sectional area that approximates that of the core of the planar waveguide. Moreover, in this embodiment the second guiding portion has a first end proximate the first guiding portion and a second end. The second end of the second guiding portion has a second thickness less than the first thickness.

Provided, in another embodiment, is a method for operating an apparatus. This method (e.g., without limitation) includes sending an optical signal through a core of an optical fiber, and coupling the optical signal from the core of the optical fiber to a core of a planar waveguide using an optical coupling structure disposed within a cladding region. In this embodiment, the optical coupling structure includes a first guiding portion having a first end proximate the core of a planar waveguide, and a second end proximate the second guiding portion and having a first thickness. The first end, in one embodiment, has a cross-sectional area that approximates that of the core of the planar waveguide. The optical coupling structure, in this embodiment, further includes a second guiding portion having a first end proximate the first guiding portion and a second end proximate the core of the optical fiber, wherein the second end of the second guiding portion has a second thickness less than the first thickness.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which:

FIGS. 2A thru 2C illustrate an alternative embodiment of an apparatus manufactured in accordance with the disclosure;

DETAILED DESCRIPTION

Figure 1A:
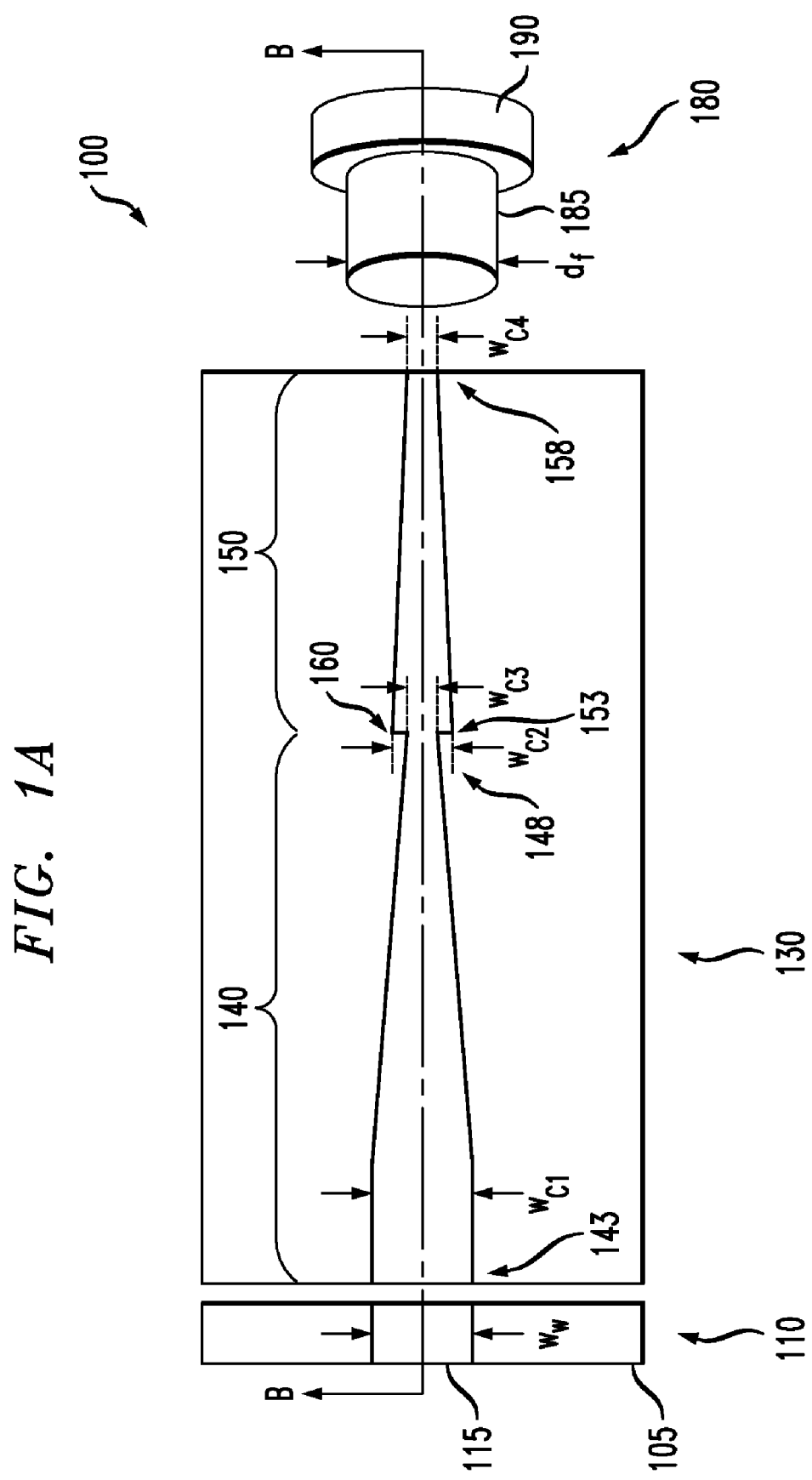
FIGS. 1A thru 1B illustrate various different views of an apparatus manufactured in accordance with this disclosure.
Figure 1B:
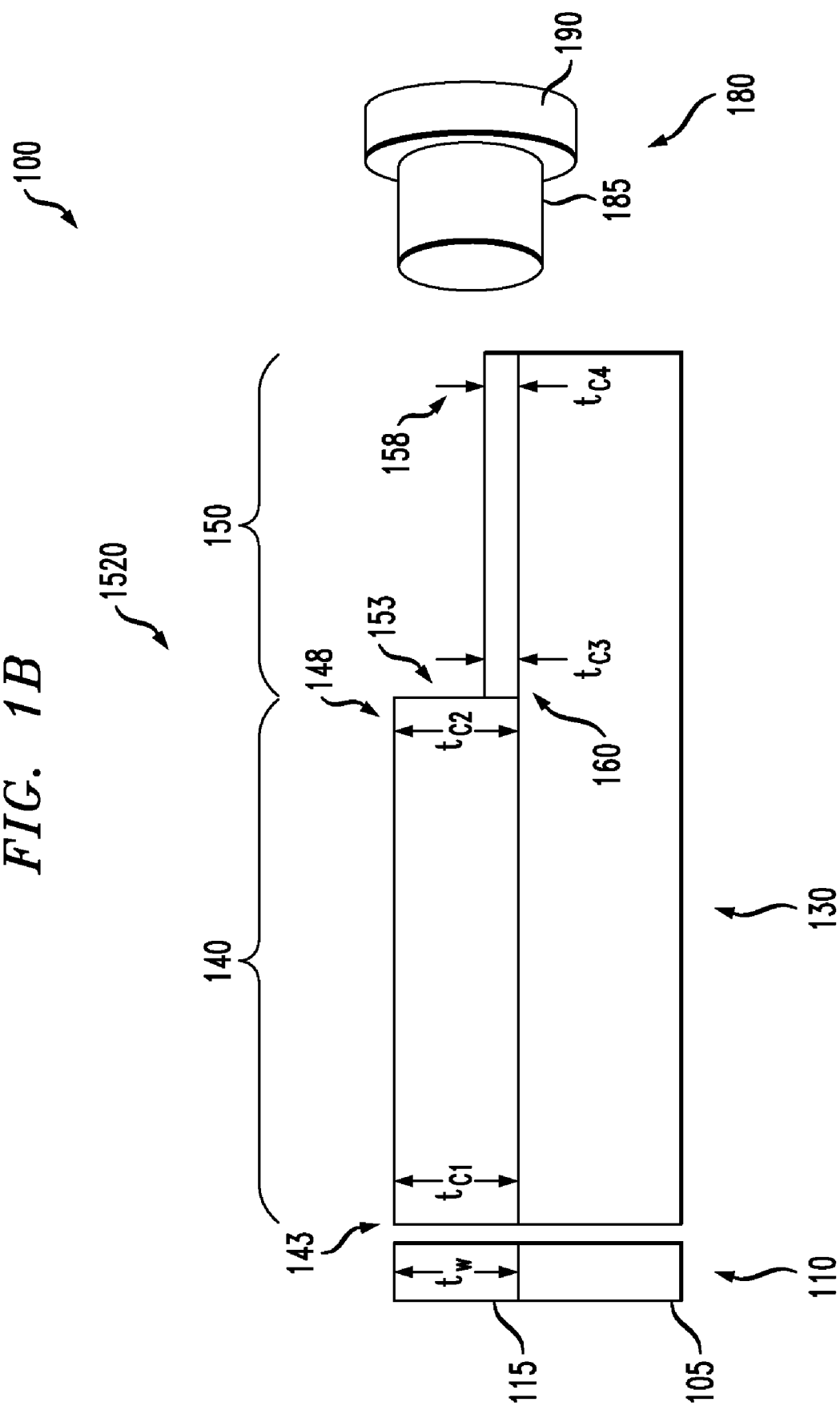

FIGS. 1A and 1B illustrate various different views of an apparatus 100 manufactured in accordance with this disclosure. The apparatus 100 of FIGS. 1A and 1B includes a planar waveguide device 110 coupled to an optical fiber 180 in accordance with the disclosure. In the given embodiment of FIGS. 1A and 1B, an optical coupling structure 130, which is formed over a substrate 105, is configured to couple the planar waveguide device 110 to the optical fiber 180, and vice versa.

The planar waveguide device 110, in the illustrated embodiment, extends axially and has a core 115 of transverse dimensions (width ($w_w$) and thickness ($t_w$)). In one example embodiment the width ($w_w$) ranges from about 400 nm to about 2000 nm, for instance about 500 nm. In another example embodiment, the thickness ($t_w$) ranges from about 180 nm to about 250 nm, for instance about 200 nm. Accordingly, the core 115 of the planar waveguide device 110 has a cross-sectional area ($A_w$), for example ranging from about 7.2E4 $nm^2$ to about 5.0E5 $nm^2$ in certain embodiments.

The optical fiber 180, in the example embodiment, is a conventional single mode fiber. For example, the optical fiber 180 might be a single mode fiber having a fiber core 185 surrounded by one or more cladding layers 190. In the illustrated embodiment, the fiber core 185 has a diameter ($d_f$), for example ranging from about 6000 nm to about 10000 nm. In one specific embodiment, the fiber core 185 has a diameter ($d_f$) around about 8200 nm. Accordingly, the fiber core 185 has a cross-sectional area ($A_f$), for example ranging from about $2.8E7$ $nm^2$ to about $7.9E7$ $nm^2$ in certain embodiments.

Positioned between the planar waveguide device 110 and the optical fiber 180 is the optical coupling structure 130. The optical coupling structure 130, in the embodiment of FIGS. 1A and 1B, includes a first guiding portion 140 and a second guiding portion 150. The first guiding portion 140 and the second guiding portion 150, collectively, help efficiently couple an optical signal from the optical fiber 180 to the planar waveguide device 110, or vice-versa. For instance, the first guiding portion 140 and the second guiding portion help efficiently match the large optical mode of the optical fiber 180 to the highly confined optical mode of the high index contrast planar waveguide device 110, or vice-versa. In one embodiment, this is accomplished through the inclusion of a thinner second guiding portion 150. For instance, the thinner second guiding portion 150 has a reduced total effective index, which causes further adiabatic expansion of the optical mode, and thus better mode matching between the optical fiber 180 and the planar waveguide device 110.

The first guiding portion 140, in the example embodiment shown, includes a first end 143 proximate the planar waveguide device 110 and a second end 148 proximate the second guiding portion 150. The first end 143, in the example embodiment, has transverse dimensions (width ($w_{C1}$) and thickness ($t_{C1}$)). In one example embodiment the width ($w_{C1}$) ranges from about 400 nm to about 2000 nm, for instance about 500 nm. In another example embodiment, the thickness ($t_{C1}$) ranges from about 180 nm to about 250 nm, for instance about 200 nm.

Accordingly, the first end 143 has a cross-sectional area ($A_{C1}$), for example ranging from about $7.2E4$ $nm^2$ to about $5.0E5$ $nm^2$ in certain embodiments. In the embodiment of FIGS. 1A and 1B, the cross-sectional area ($A_{C1}$) approximates the cross-sectional area ($A_w$) of the core 115. The term "approximates", as used in this context, means that a ratio of the cross-sectional area ($A_{C1}$) to the cross-sectional area ($A_w$) ranges from about 7:10 to about 10:13, and preferably in the range from about 9:10 to about 10:11. In other embodiments, the cross-sectional area ($A_{C1}$) is the same as the cross-sectional area ($A_w$) of the core 115. Because the first guiding portion 140 and the core 115 comprise similar materials, e.g., materials of similar refractive indexes, the optical mode of these two features should be substantially matched. Accordingly, only a limited amount of optical loss would occur between these two features.

The second end 148, on the other hand, has transverse dimensions (width ($W_{C2}$) and thickness ($t_{C2}$)). In one example embodiment the width ($W_{C2}$) ranges from about 130 nm to about 160 nm, for instance about 150 nm. In another example embodiment, the thickness ($t_{C2}$) ranges from about 180 nm to about 250 nm, for instance about 200 nm. Accordingly, the second end 148 has a cross-sectional area ($A_{C2}$), for example ranging from about $2.3E4$ $nm^2$ to about $4.0E4$ $nm^2$ in certain embodiments. Therefore, in the embodiment of FIGS. 1A thru 1B, the first guiding portion 140 has an adiabatically (e.g., gradual) decreasing width from the first end 143 to the second end 148, but has a same thickness from the first end 143 to the second end 148 (e.g., an entire length of the first guiding portion 140 has a same thickness).

The second guiding portion 150 in the example embodiment shown includes a first end 153 proximate the second end 148 of the first guiding portion 140, and a second end 158 proximate the core 185 of the optical fiber 180. The first end 153, in the example embodiment, has transverse dimensions (width ($w_{C3}$) and thickness ($t_{C3}$)). In one example embodiment, the width ($w_{C3}$) ranges from about 300 nm to about 600 nm, for instance about 500 nm. In another example embodiment, the thickness ($t_{C3}$) ranges from about 40 nm to about 100 nm, for instance about 50 nm. Accordingly, the first end 153 has a cross-sectional area ($A_{C3}$), for example ranging from about $1.2E4$ $nm^2$ to about $6.0E4$ $nm^2$ in certain embodiments.

The second end 158, on the other hand, has transverse dimensions (width ($w_{C4}$) and thickness ($t_{C4}$)) In one example embodiment the width ($w_{C4}$) ranges from about 130 nm to about 160 nm, for instance about 150 nm. In another example embodiment, the thickness ($t_{C4}$) ranges from about 40 nm to about 100 nm, for instance about 500 nm. Accordingly, the second end 158 has a cross-sectional area ($A_{C4}$), for example ranging from about $5.2E3$ $nm^2$ to about $1.6E4$ $nm^2$ in certain embodiments. Therefore, in the embodiment of FIGS. 1A and 1B, the second guiding portion 150 has an adiabatically (e.g., gradual) decreasing width from the first end 153 to the second end 158, but has a same thickness from the first end 153 to the second end 158 (e.g., an entire length of the second guiding portion 150 has a same thickness). Moreover, the cross-sectional area ($A_{C4}$) is small compared to the cross-sectional area ($A_f$) of the core 185. For example, in one embodiment the cross-sectional area ($A_{C4}$) is less than about 1 percent (and possibly even less than 0.1 percent) of the cross-sectional area ($A_f$) of the core 185. Moreover, in this embodiment the cross-sectional areas ($A_{C3}$ and $A_{C4}$) decrease significantly from the cross-sectional area ($A_f$) of the core 185, but then increase up to the cross-sectional area ($A_w$) of the planar waveguide device 110.

As is evident in the embodiment of FIGS. 1A and 1B, at an interface region 160 (e.g., where the first guiding portion 140 meets the second guiding portion 150) the width ($w_{C2}$) of the second end 148 is less than the width ($w_{C3}$) of the first end 153. Moreover, because the drastic change in thickness between the first guiding portion 140 and the second guiding portion 150 at this interface, the transition there between is abrupt. Certain other embodiments may exist wherein the apparatus 100 is designed such that a more gradual transition exists.

Located over the first and second guiding portions 140, 150, respectively may be an additional cladding layer. The substrate 105 and additional cladding layer would collectively form a low refractive index cladding region, which would surround the first and second guiding portions 140, 150. The low refractive index cladding region, would thus help confine the signal within the first and second guiding portions 140, 150.

Figure 2A:
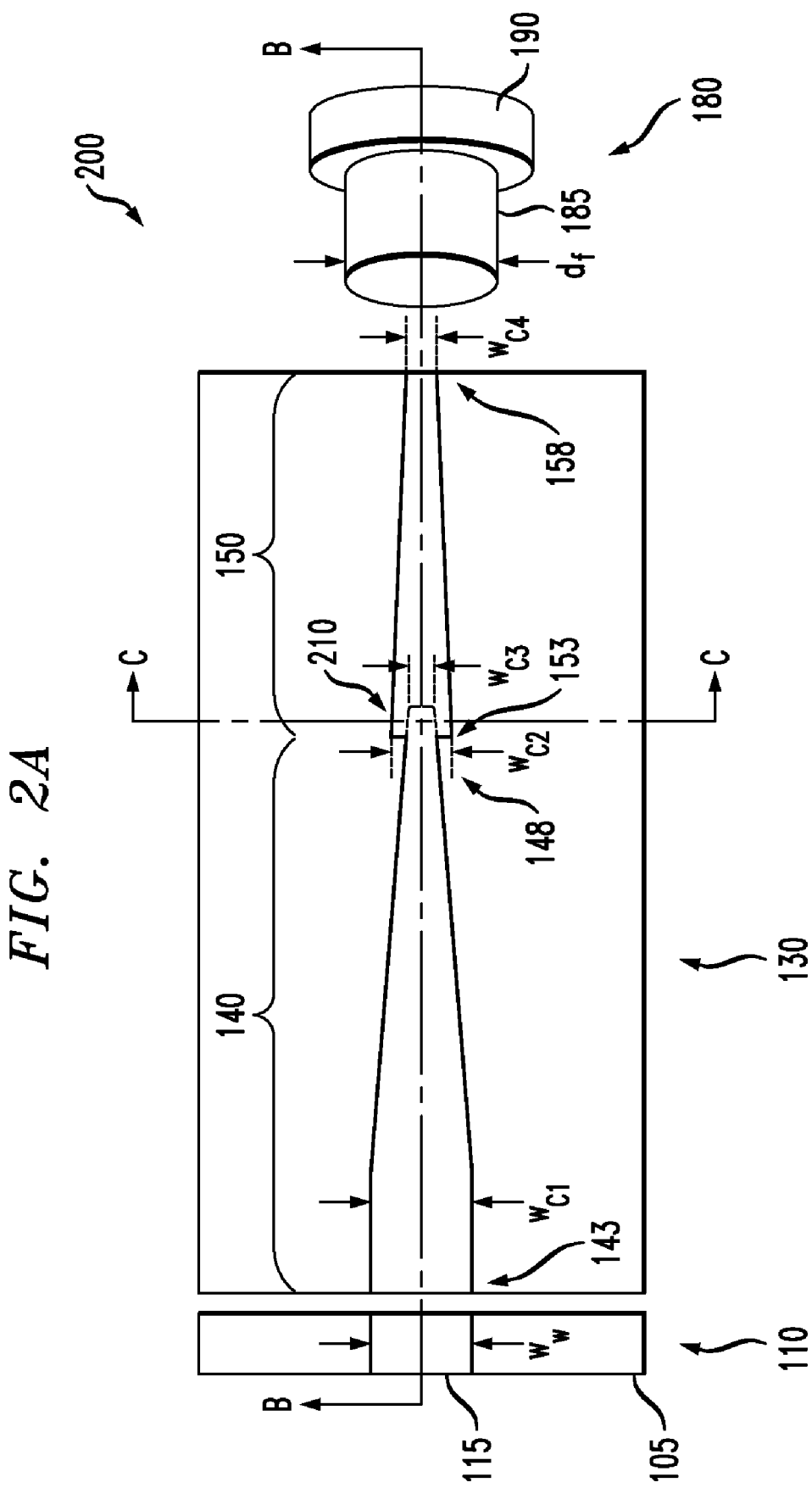
Figure 2B:
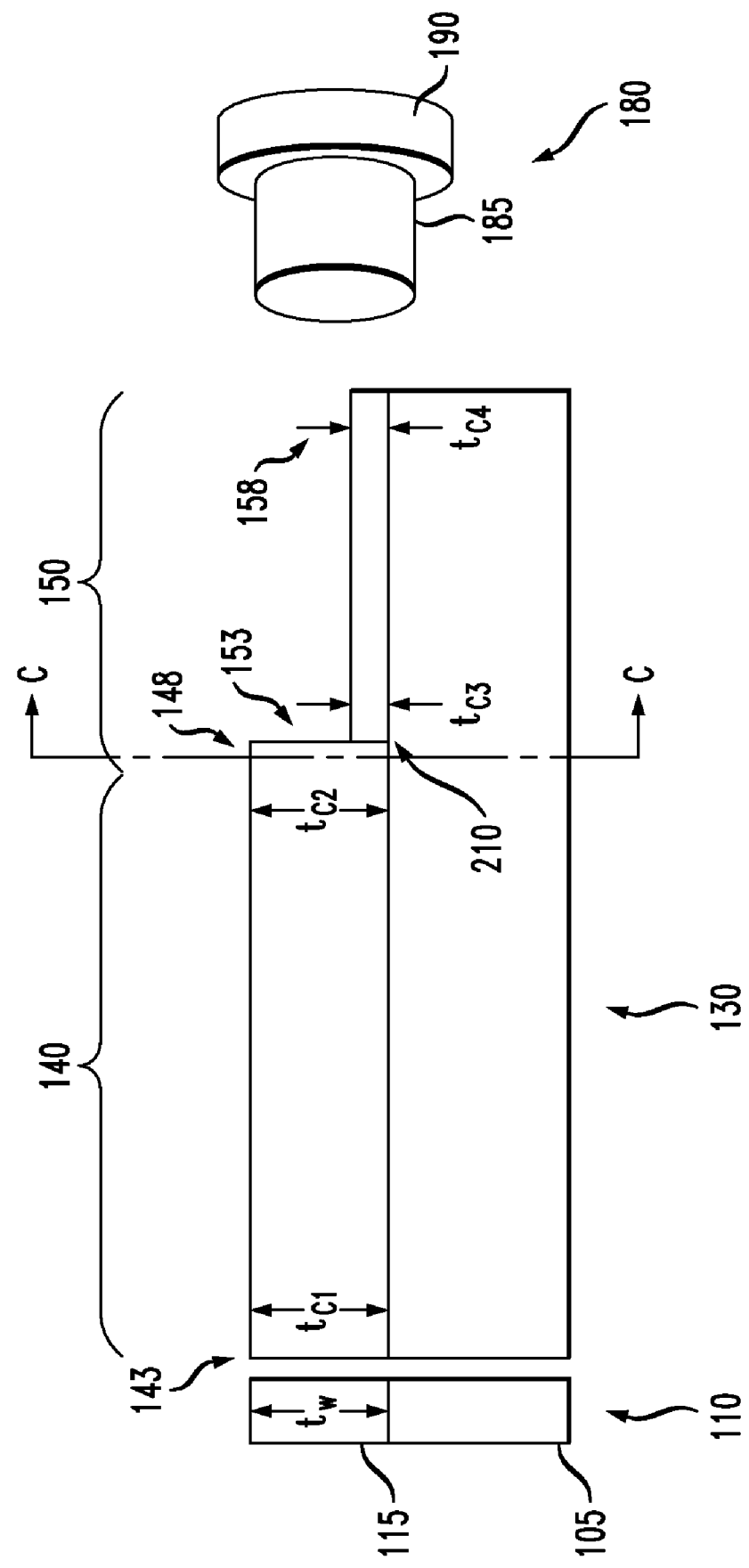

FIGS. 2A thru 2C illustrate an alternative embodiment of an apparatus 200 manufactured in accordance with the disclosure. The apparatus 200 of FIGS. 2A thru 2C is similar to the apparatus 100 of FIGS. 1A and 1B with the exception of a few minor details. Accordingly, similar reference numerals indicate similar features and dissimilar reference numerals (or new reference numerals) indicate different or additional features.

The apparatus 200, as opposed to the apparatus 100, includes an interface region 210, for example where the second end 148 of the first guiding portion 140 extends over the second guiding portion 150. What results, as illustrated clearly in FIG. 2C, is the interface region 210 including both the first guiding portion 140 and the second guiding portion 150. For example, the interface region 210 might be shaped like an inverted T. A configuration such as that illustrated in FIGS. 2A thru 2C attempts to better match the optical modes of the first guiding portion 140 and the second guiding portion 150 at the interface region 210.

Figure 3B:
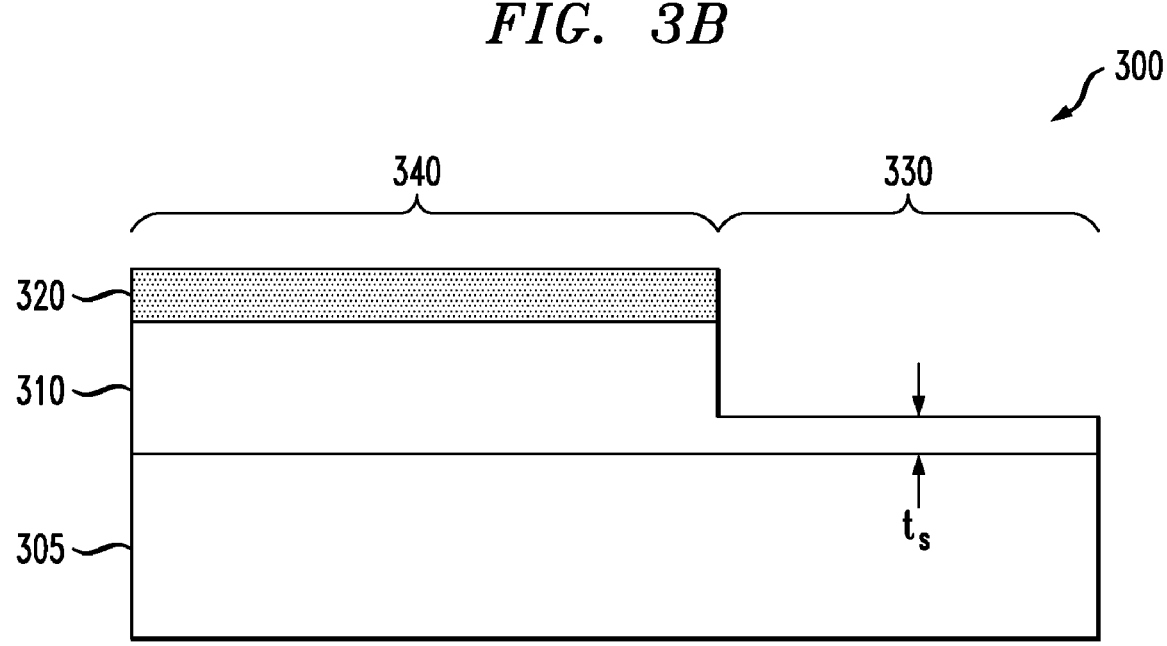
FIGS. 3A thru 4C illustrate one embodiment for manufacturing an apparatus in accordance with the disclosure.

FIGS. 3A thru 4C illustrate one embodiment for manufacturing an apparatus in accordance with the disclosure. FIGS. 3A thru 3C illustrate various views of an apparatus 300 at an initial stage of manufacture. The apparatus 300 of FIGS. 3A thru 3C includes a substrate 305. The substrate 305 may comprise many different materials or combination of materials and remain within the purview of the disclosure. In one embodiment, however, the substrate 305 comprises a low refractive index optical cladding layer, for example silicon dioxide.

The thickness of the substrate 305 may vary greatly while remaining within the purview of the disclosure. Nevertheless, one particular embodiment uses a thick substrate, for example a substrate thickness greater than about 3500 nm. In yet an even different embodiment, the thickness is greater than about 5000 nm. These thicknesses are in contrast to traditional substrates, which might include thicknesses of about 3000 nm or less. The increased thickness is particularly useful when an extremely wide expanded mode exists at the input of the apparatus 300.

Located over the substrate 305 is a higher refractive index core layer 310. In one particular embodiment, the higher refractive index core layer 310 comprises silicon, as opposed to silica. The higher refractive index core layer 310 originally has a thickness ranging from about 180 nm to about 250 nm, and more particularly about 200 nm and covers the entire substrate 305. Nevertheless, other thicknesses could be used.

Those skilled in the art understand the processes that might be used to form each of the substrate 305 and higher refractive index core layer 310. In one embodiment, however, the substrate 305 is formed by low-pressure steam oxidation of silicon followed by an anneal. Then, the higher refractive index core layer 310 is deposited on the substrate 305, for example by Plasma Enhanced Vapor Deposition (PECVD) or Low Pressure Chemical Vapor Deposition (LPCVD). In an alternative embodiment, the substrate 305 and higher refractive index core layer 310 are formed as a part of a silicon-on-insulator (SOI) substrate.

Positioned and patterned over the higher refractive index core layer 310 is a first masking layer 320. The first masking layer 320 may comprise a conventional photoresist layer, conventional hardmask layer or combination of the two. The first masking layer 320, in the embodiment of FIGS. 3A thru 3C, exposes a second guiding portion 330 of the higher refractive index core layer 310 while protecting remaining portions thereof, including the first guiding portion 340. The first masking layer 320 may be formed and patterned using conventional lithography steps.

The first masking layer 320 is then used to etch the exposed higher refractive index core layer 310 in the second guiding portion 330. In this embodiment, a conventional timed silicon etch is used to define a thickness ($t_s$) of the resulting second guiding portion 330. For example, a timed silicon reactive ion etch could be used in one embodiment. Nevertheless, other conventional isotropic or anisotropic etches and methods for determining the duration of the etches could be used.

Figure 3C:
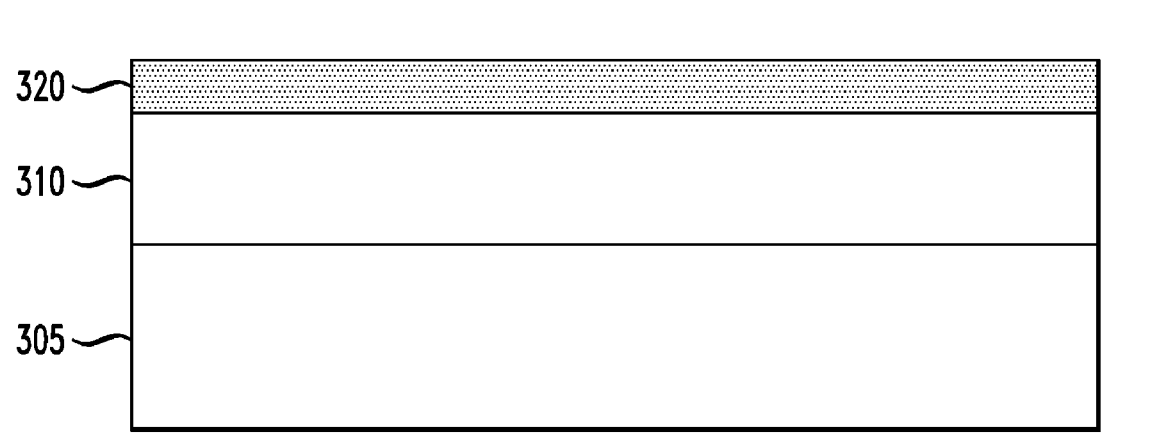
Figure 4A:
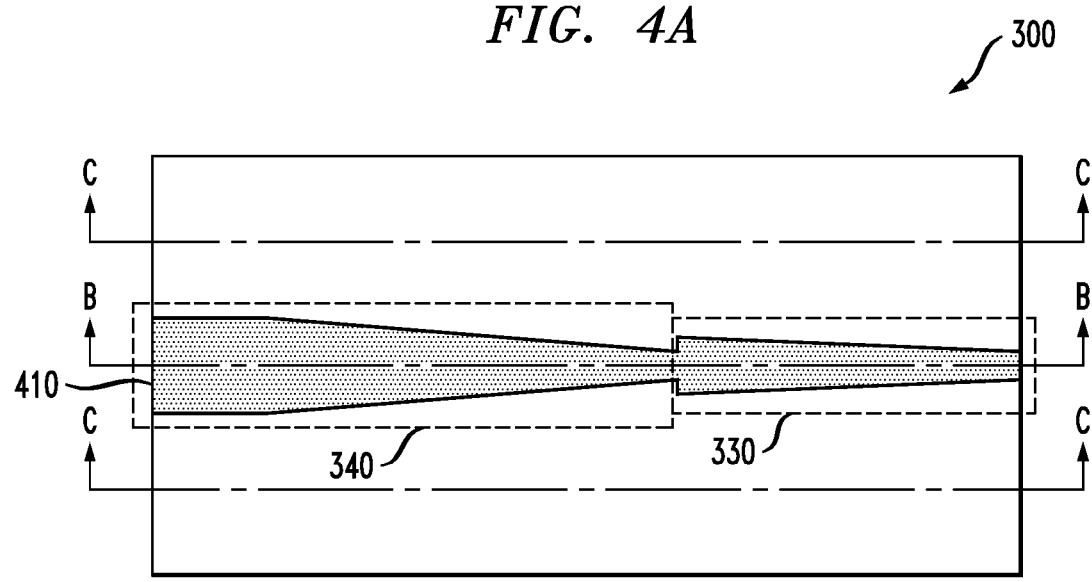
Figure 4B:
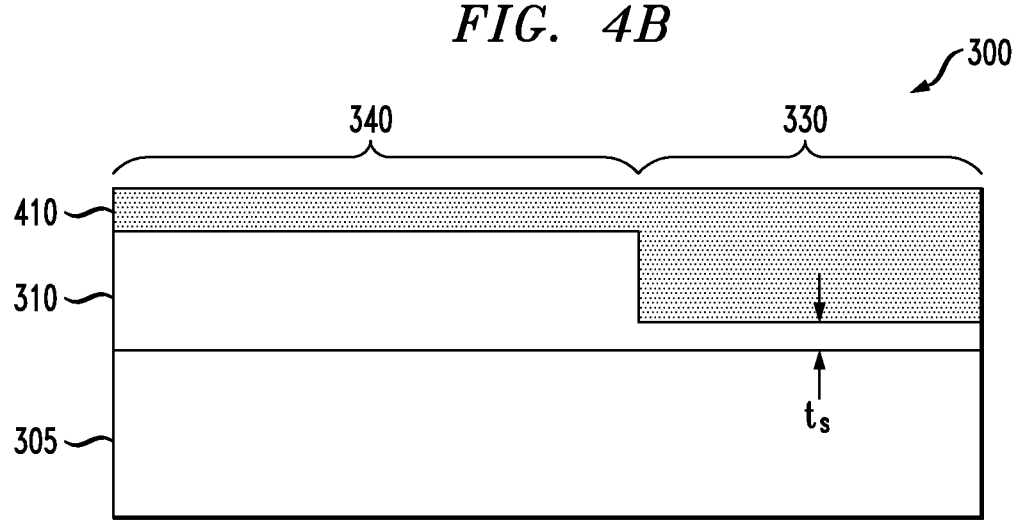
Figure 4C:
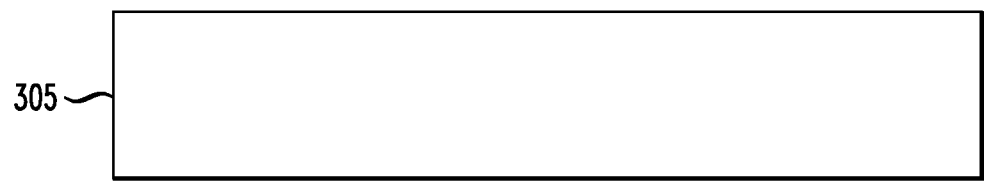

FIGS. 4A thru 4C illustrate the apparatus 300 of FIGS. 3A thru 3C after removing the first masking layer 320 and forming and patterning a second masking layer 410 over the higher refractive index core layer 310. The second masking layer 410 may additionally comprise a conventional photoresist layer, a conventional hardmask layer or combination of the two. The second masking layer 410, in the embodiment shown, protects the second guiding portion 330 and the first guiding portion 340 of the higher refractive index core layer 310, while exposing remaining portions thereof. The second masking layer 410 may be formed and patterned using a process that is similar to the processes used to form and pattern the first masking layer 310.

The second masking layer 410 is then used to etch the exposed higher refractive index core layer 310, and thus finish defining the first and second guiding portions 340, 330, respectively. In this embodiment, an etchant that is selective to the substrate 305 may be used. For example, an etchant that removes the exposed higher refractive index core layer 310 but stops on the substrate 305 would be particularly useful. Nevertheless, a timed etch might be used in an alternative embodiment.

Figure 5:
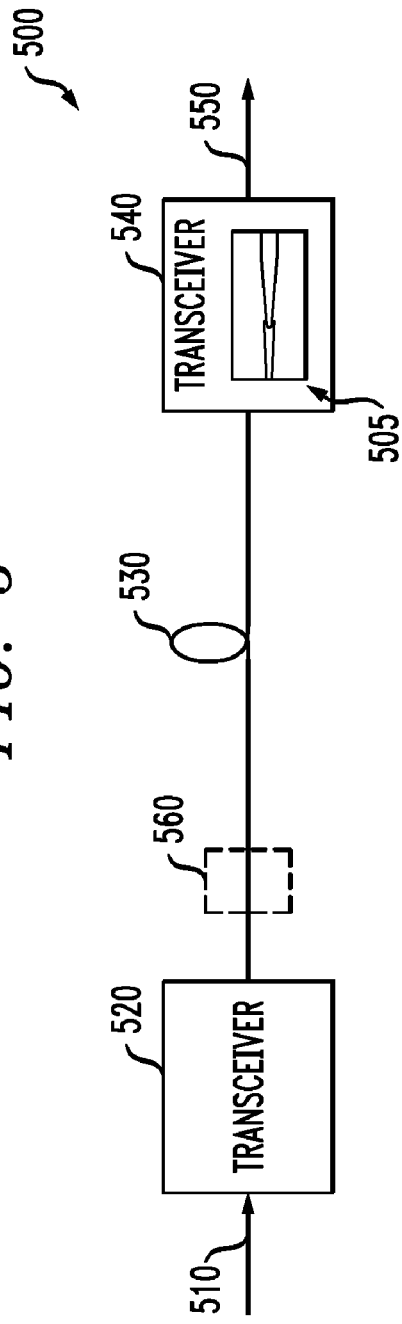
FIG. 5 illustrates an optical communications system, which may form one environment in which an apparatus constructed according to the disclosure, may be used.

Turning now to FIG. 5, illustrated is a plan view of an optical communications system 500, which may form one environment in which an apparatus 505 (e.g., similar to one of the apparatus 100, 200, 300) may be used. An initial signal 510 enters a transceiver 520 of the optical communications system 500. The transceiver 520, receives the input data signal 510, modulates the data signal 510 onto an optical carrier and sends the resulting information-carrying optical carrier across an optical fiber 530 to a transceiver 540. The transceiver 540 receives the information-carrying optical carrier from the optical fiber 530, demodulates the information thereon from the optical carrier, and sends an output data signal 550. As illustrated in FIG. 5, the apparatus 505 may be included within the transceiver 540. The apparatus 505 may also be included anywhere in the optical communications system 500, including the transceiver 520. It should be noted that the optical communications system 500 is not limited to the devices previously mentioned. For example, the optical communications system 500 may include an element 560, such as a laser, diode, optical modulator, optical demodulator, optical amplifier, optical waveguide, photodetectors, or other similar device, which may also include the apparatus 505.

Figure 6:
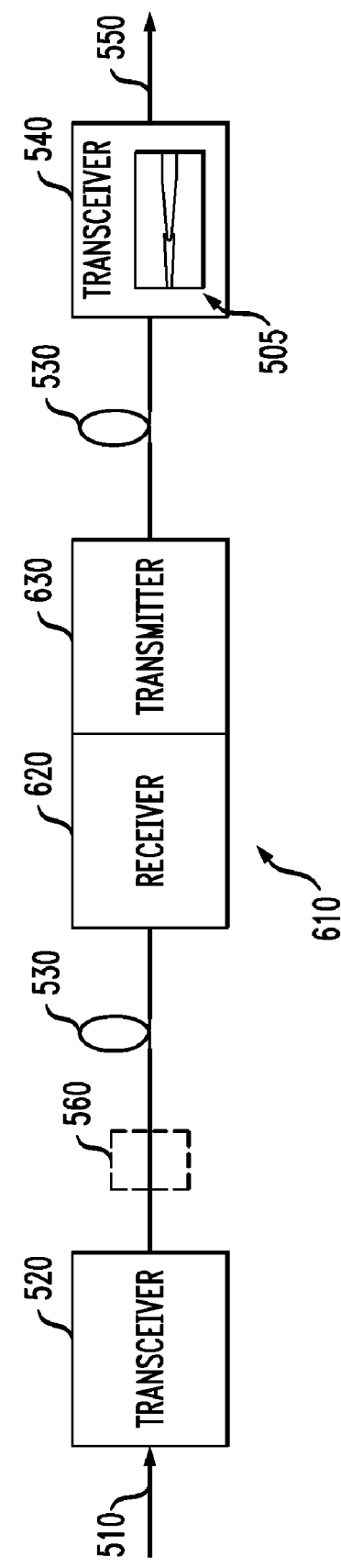
FIG. 6 illustrates an alternative embodiment of an optical communication system.

Turning briefly to FIG. 6, illustrated is an alternative optical communications system 600, having a repeater 610, including a second receiver 620 and a second transmitter 630 (e.g., collectively a transceiver), located between the transceiver 520 and the transceiver 540. As illustrated, the alternative optical communications system 600 may also include the apparatus 505.

Although the present invention has been described in detail, those skilled in the art should understand that they can make various changes, substitutions and alterations herein without departing from the spirit and scope of the invention.

What is claimed is:

1. An apparatus, comprising:
an optical coupling structure disposed proximate a planar waveguide and within a low refractive index cladding region, whereinthe optical coupling structure includes a first guiding portion and a second guiding portion;
the first guiding portion having a first end proximate a core of the planar waveguide and having a first width, and a secondend proximate the second guiding portion and having a second width, wherein the second end of the first guiding portion has a first thickness; and
the second guiding portion having a first end adjacent to the second end of the first guiding portion and having a third width, and a second end having a fourth width, wherein the second end of the second guiding portion has a second thickness less than the firstthickness, and further wherein the second width is less than the third width at a point where the first and second guiding portions encounter one another, wherein the second guiding portion is end-coupleable to a single mode optical fiber and a cross-sectional area of the second end of the second guiding portion is less than about 1 percent of a cross-sectional area of a core of the single mode optical fiber to which the second guiding portion is end-coupleable.

2. The apparatus of claim 1 wherein the first end of the first guiding portion has a cross-sectional area that approximates that of the core of the planar waveguide.

3. The apparatus of claim 1 wherein an entire length of the first guiding portion has the first thickness and an entire length of the second guiding portion has the second thickness.

4. The apparatus of claim 3 wherein a thickness transition between the first guiding portion and the second guiding portion is abrupt.

5. The apparatus of claim 1 wherein the second width is less than the first width.

6. The apparatus of claim 1 wherein the optical coupling structure comprises silicon and the low refractive index cladding region comprises silicon dioxide.

7. The apparatus of claim 1 wherein the cross-sectional area of the second end of the second guiding portion is less than about .1 percent of the cross-sectional area of a core of a single mode optical fiber.

8. The apparatus of claim 1 wherein the cross-sectional area of the second end of the second guiding portion is less than about $5.3E5$ $nm^2$.

9. The apparatus of claim 1 wherein the second end of the first guiding portion extends over a portion of the second guiding portion.

10. The apparatus of claim 1 further including the single mode optical fiber, wherein the second end of the second guiding portion is proximate to the core of the single mode optical fiber.

11. The apparatus of claim 10 wherein the planar waveguide, the optical coupling structure and the core of the single mode optical fiber form at least a portion of an optical communications system.

12. A method for operating an apparatus, comprising:
sending an optical signal through a core of a single mode optical fiber; and
coupling the optical signal from the core of the optical fiber to a core of a planar waveguide using an optical coupling structure disposed within a lower refractive index cladding region, the optical coupling structure including:
a first guiding portion having a first end having a first width proximate the core of the planar waveguide and a second end having a second width, wherein the second end of the first guiding portion has a first thickness; and
a second guiding portion having a first end having a third width adjacent to the second end of the first guiding portion and a second end having a fourth width proximate the core of the optical fiber, wherein the second end of the second guiding portion has a second thickness less than the first thickness, and further wherein the second width is less than the third width at a point where the first and second guiding portions encounter one another, and a cross-sectional area of the second end of the second guiding portion is less than about 1 percent of a cross-sectional area of the core of the single mode optical fiber.

13. The method of claim 12 wherein the first end of the first guiding portion has a cross-sectional area that approximates that of the core of the planar waveguide.

14. The method of claim 12 wherein the second width is less than the first width.

15. The method of claim 12 wherein the second end of the first guiding portion extends over a portion of the second guiding portion.

16. The method of claim 12 wherein the cross-sectional area of the second end of the second guiding portion is less than about .1 percent of the cross-sectional area of the core of the single mode optical fiber.

17. An apparatus, comprising:
an optical coupling structure disposed within a low refractive index cladding region, wherein the optical coupling structure includes a first guiding portion configured to couple to a planar waveguide and a second guiding portion end-coupleable to a single mode optical fiber;
the first guiding portion having a first end with a first width proximate a core of the planar waveguide, and a second end with a second width proximate the second guiding portion and having a first thickness; and
the second guiding portion having a first end with a third width adjacent to the second end of the first guiding portion and a second end with a fourth width, wherein the second end of the second guiding portion has a second thickness less than the first thickness, and further wherein the second width is less than the first width, and further wherein the second width is less than the third width at a point where the first and second guiding portions encounter one another, the fourth width is less than the third width, and a cross-sectional area of the second end of the second guiding portion is less than about 1 percent of a cross-sectional area of a core of the single mode optical fiber.

18. The apparatus of claim 17, wherein a cross-sectional area of the first end of the first guiding portion is greater than the cross-sectional area of the second end of the second guiding portion.

19. An apparatus, comprising:
an optical coupling structure disposed within a low refractive index cladding region, wherein the optical coupling structure includes a first guiding portion and a second guiding portion;
the first guiding portion having a first end with a first width proximate a core of a planar waveguide, and a second end with a second width proximate the second guiding portion, the second end of the first guiding portion having a first thickness; and
the second guiding portion having a first end with a third width adjacent to the second end of the first guiding portion and a second end with a fourth width proximate a core of an optical fiber, wherein the second end of the second guiding portion has a second thickness less than the first thickness, and further wherein the second width is less than the third width at a point where the first and second guiding portions encounter one another, and a cross-sectional area of the second end of the second guiding portion is less than about 1 percent of a cross-sectional area of the core of the optical fiber.

20. The apparatus of claim 17 wherein the cross-sectional area of the second end of the second guiding portion is less than about $5.3E5$ $nm^2$.

21. The apparatus of claim 19 wherein the cross-sectional area of the second end of the second guiding portion is less than about $5.3E5$ $nm^2$.

* * * * *